Jan. 5, 1937.　　　J. E. SNELLING　　　2,066,807
COFFEEPOT
Filed July 28, 1936　　　2 Sheets-Sheet 1

Inventor
J. E. Snelling
By Clarence A. O'Brien
Hyman Berman
Attorneys

Jan. 5, 1937.   J. E. SNELLING   2,066,807
COFFEEPOT
Filed July 28, 1936   2 Sheets-Sheet 2
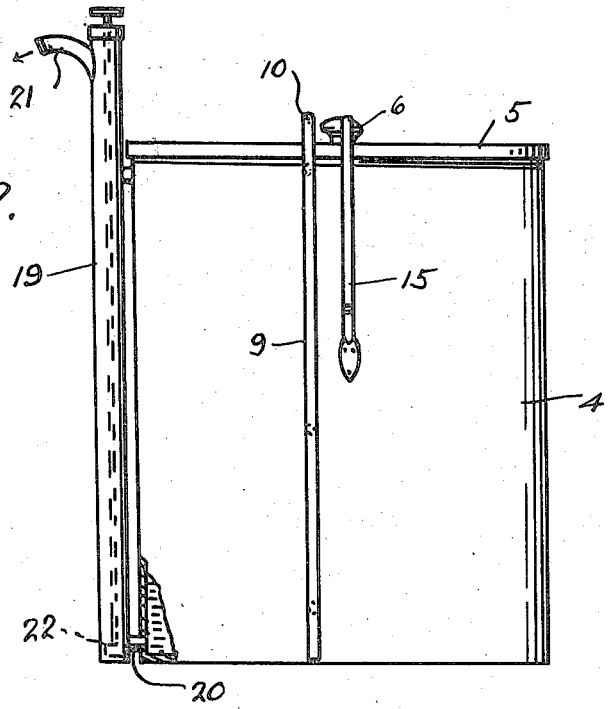
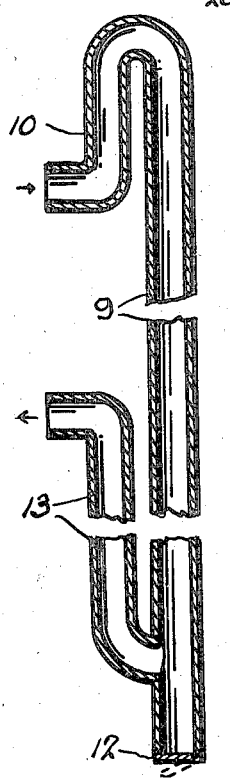
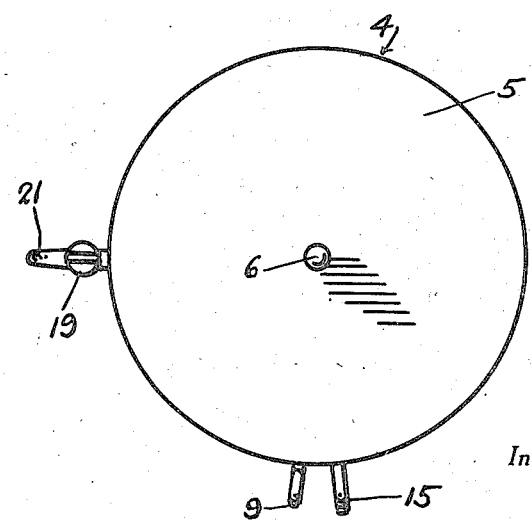
Inventor
J. E. Snelling
By Clarence A. O'Brien
Hyman Berman
Attorneys Patented Jan. 5, 1937

2,066,807

UNITED STATES PATENT OFFICE 2,066,807

COFFEEPOT

Jesse E. Snelling, Columbus, Ohio

Application July 28, 1936, Serial No. 93,080

2 Claims. (Cl. 53—3)

The present invention relates to new and useful improvements in coffee pots and has for its primary object to provide, in a manner as hereinafter set forth, a device of this character embodying a novel construction, combination and arrangement of parts through the medium of which the flavor of the coffee will be preserved and the escape of the aroma will be prevented.

Another very important object of the invention is to provide a coffee pot of the aforementioned character which will permit the use of a minimum of coffee and still produce a good brew.

Other objects of the invention are to provide a coffee pot which will be comparatively simple in construction, strong, durable, reliable, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a view in side elevation of a slightly modified form of inner receptacle.

Figure 3 is a detail view in vertical section through the condensing tube.

Figure 4 is a top plan view of the arrangement shown in Figure 2.

Figure 1:
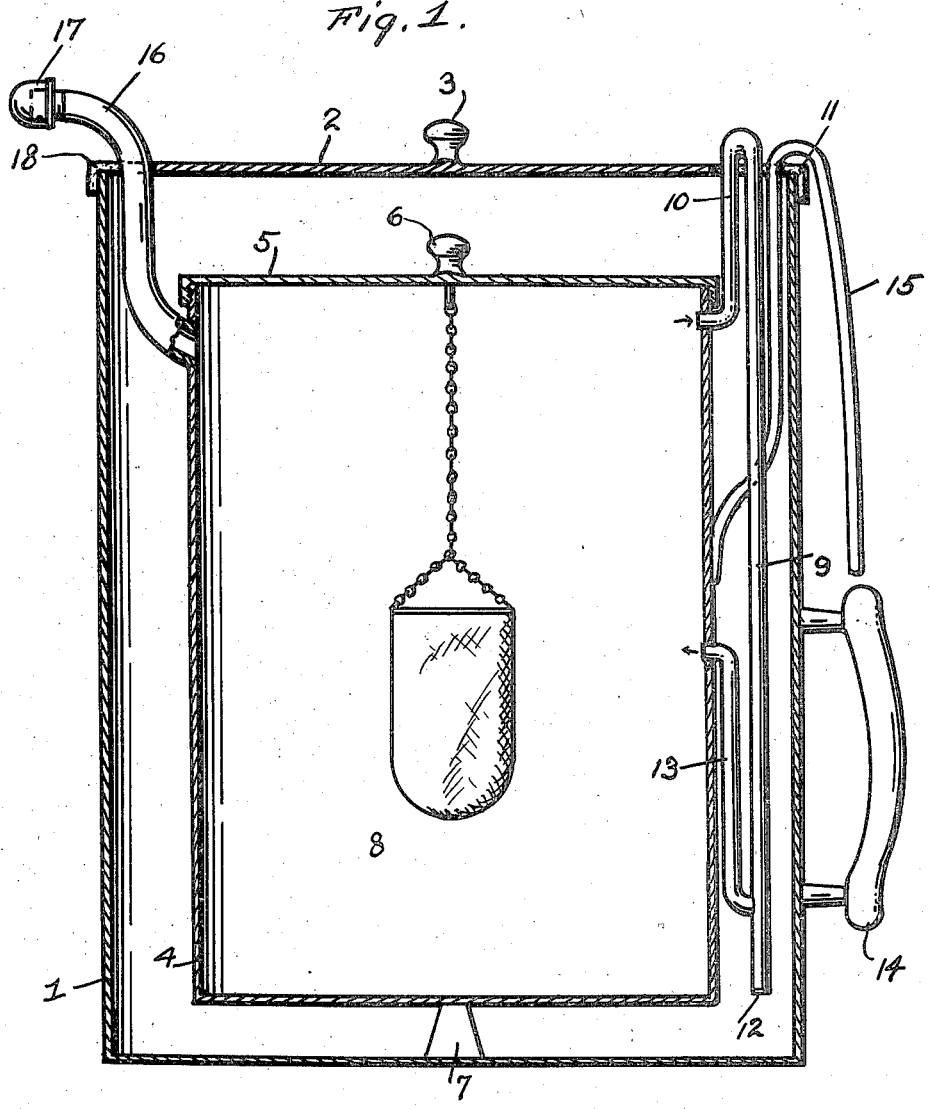
Figure 1 is a view in vertical section through an embodiment of the invention.

Referring now to the drawings in detail, it will be seen that the reference numeral 1 designates an outer receptacle for the reception of water, said outer receptacle being provided with a removable cover 2 having a handle 3. Mounted in the outer receptacle 1 and spaced therefrom at all points is an inner receptacle 4 having threadedly mounted thereon a removable cover 5 which is provided with a handle 6. A supporting post 7 is provided for the inner receptacle 4. The reference numeral 8 designates a coffee bag which is suspended in the inner receptacle 4.

The reference numeral 9 designates a condensing tube which is mounted vertically on the exterior of the inner receptacle 4. At its upper end, the tube 9 terminates in a gooseneck 10 which projects through an opening 11 in the cover 2 and which communicates with the upper portion of the inner receptacle 4. A check valve 12 is provided on the lower or discharge end of the tube 9. A branch 13 extends from the lower portion of the tube 9 to an intermediate portion of the inner receptacle 4.

The outer receptacle 1 has fixed thereon a suitable handle 14. The reference numeral 15 designates a handle for the inner receptacle 4, said handle 15 extending upwardly through the opening 11 and then downwardly on the outside of the outer receptacle 1. This is shown to advantage in Figure 1 of the drawings. Opposite the handle 15 the inner receptacle 4 is provided with a pouring spout 16 having mounted on its discharge end a removable closure cap 17. An opening 18 is provided in the cover 2 for the spout 16.

It is thought that the operation of the invention will be readily apparent from a consideration of the foregoing. The outer receptacle 1 is filled with water to the desired level, which water transmits heat to the inner receptacle 4 in a uniform manner. Vapors which are generated in the inner receptacle 4 pass upwardly in the gooseneck 10 in the upper portion of which said vapors are condensed, the liquid dropping by gravity in the pipe 9 and being discharged into the water in the outer receptacle 1, said liquid passing the check valve 12. The vapors which are not condensed return to the inner receptacle 4 through the branch 13. Of course, the coffee may be conveniently poured by simply removing the cap 17 from the spout 16 and tilting the pot through the medium of the handle 14. The check valve 12 prevents water from the outer receptacle 1 from entering the condensing tube 9.

In the arrangement shown in Figures 2 and 4 of the drawings a manually operable lift pump 19 is mounted vertically on the outside of the inner receptacle 4 and communicate therewith adjacent the bottom thereof, as at 20. A discharge spout 21 projects from the upper end portion of the pump 19. In this arrangement coffee from the receptacle 4 fills the barrel of the pump 19 to a level corresponding to that of said coffee in said inner receptacle. To dispense this coffee it is only necessary to lift the piston 22 of the pump 19. The pump 19 is particularly desirable on comparatively large coffee pots, such as those used in restaurants.

It is believed that the many advantages of a coffee pot constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:—

1. A coffee pot comprising an outer receptacle for the reception of water and an inner receptacle for the reception of coffee spaced from said outer receptacle, a pouring spout communicating with the inner receptacle, and a condensing tube mounted on said inner receptacle, said condensing tube including a gooseneck projecting through the outer receptacle to the atmosphere and connected to the upper portion of the inner receptacle, said condensing tube communicating, at one end, with the outer receptacle and including a check valve for said one end, and a return branch connecting the condensing tube with the inner receptacle.

2. A coffee pot of the class described comprising spaced inner and outer receptacles, the inner receptacle for the reception of coffee, the outer receptacle being for the reception of water, said receptacles including covers, a pouring spout on the inner receptacle extending through the cover of the outer receptacle, a handle on the outer receptacle, a handle on the inner receptacle extending through the cover of the outer receptacle, and a condensing tube mounted on the inner receptacle, said condensing tube including a gooseneck on one end projecting through the cover of the outer receptacle and connected to the upper portion of the inner receptacle, said tube communicating at its other end with the outer receptacle, a check valve on said other end of the condensing tube, and a return branch connecting the condensing tube with the inner receptacle at an intermediate point.

JESSE E. SNELLING.